(12) United States Patent
Wolford et al.

(10) Patent No.: US 6,582,593 B2
(45) Date of Patent: Jun. 24, 2003

(54) TRANSMISSION SUMP FILTER WITH BYPASS VALVE

(75) Inventors: James B. Wolford, Chicago, IL (US); Mitch Kujawski, Des Plaines, IL (US); Morgan Bullard, Palatine, IL (US); John E. Szydlo, Brookfield, IL (US); Yakov Sarnov, Morton Grove, IL (US)

(73) Assignee: SPX Corporation, Charlotte, NC (US)

( * ) Notice: Subject to any disclaimer, the term of this patent is extended or adjusted under 35 U.S.C. 154(b) by 45 days.

(21) Appl. No.: 09/870,172

(22) Filed: May 30, 2001

(65) Prior Publication Data

US 2002/0179507 A1 Dec. 5, 2002

(51) Int. Cl.⁷ ............................................. B01D 35/147
(52) U.S. Cl. ........................ 210/130; 210/168; 210/172; 210/416.5; 210/420; 210/445; 210/455
(58) Field of Search ................................. 210/130–133, 210/149, 168, 445, 452, 455, 486, 172, 416.5, 420

(56) References Cited

U.S. PATENT DOCUMENTS

| 3,056,501 A | * | 10/1962 | Thorman et al. | ....... 123/196 A |
| 4,129,503 A | * | 12/1978 | Joseph | ....... 137/590 |
| 4,450,581 A | * | 5/1984 | Hirata | ....... 229/214 |
| 4,783,271 A | * | 11/1988 | Silverwater | ....... 210/149 |

FOREIGN PATENT DOCUMENTS

| JP | 2-78408 | * | 3/1990 | ....... 210/130 |

* cited by examiner

Primary Examiner—Matthew O. Savage
(74) Attorney, Agent, or Firm—Baker & Hostetler, L.L.P.

(57) ABSTRACT

A filter (10) for filtering debris out of the fluid in a transmission sump (S) prior to the fluid entering a transmission pump (P) is disclosed. The filter (10) includes a filter housing (12) presenting a filter inlet (30), a bypass inlet (32), and an outlet (46). Filter media (14) is disposed in the housing (12) such that fluid flowing from the filter inlet (30) to the outlet (46) passes through the media (14) and fluid flows from the bypass inlet (32) to the outlet (46) without passing through the media (14). A bypass valve assembly (16), shiftable into and out of a closed position, prevents fluid flow through the bypass inlet (32) when the valve (16) is closed.

3 Claims, 4 Drawing Sheets

TRANSMISSION SUMP FILTER WITH BYPASS VALVE

BACKGROUND OF THE INVENTION

1. Field of the Invention

The present invention relates generally to transmission sump filters for powered vehicles. More specifically, the present invention concerns a transmission fluid filter having a uniquely configured bypass valve that operates to efficiently and effectively direct fluid to a transmission pump without passing it through a filter media in conditions when bypass is desirable (e.g., cold and start-up conditions).

2. Discussion of Prior Art

In a powered vehicle having a lubricated transmission, it is desirable to filter debris (e.g., solid particles, impurities, etc.) out of the fluid in the transmission sump prior to the fluid entering the transmission pump. Known prior art filters utilize a porous filter media fluidly interposed between the sump and the pump to filter the fluid. Unfortunately, these prior art filters are problematic because in certain conditions (e.g., cold and start-up conditions), the fluid is not adequately sucked through the filter media (e.g., the fluid is too viscous) and thus fluid is not sufficiently provided to the pump.

Some prior art filters utilize a bypass valve to bypass the filter media during these conditions when bypass is desired. These prior art filter bypass valves; however, are problematic in that they are costly to construct, unreliable, and ineffective and inefficient in providing sufficient fluid to the pump during bypass conditions.

SUMMARY OF THE INVENTION

The present invention provides an improved filter that does not suffer from the problems and limitations of prior art filters set forth above. The inventive filter provides a bypass valve that reliably operates when bypass is desired, reliably closes when bypass is not desired, and effectively and efficiently provides fluid to the pump when in operation. The inventive filter further provides a bypass valve that is simple and inexpensive to construct.

A first aspect of the present invention concerns a filter broadly including a filter housing presenting a filter inlet, a bypass inlet, and an outlet; filter media in the housing such that fluid flowing from the filter inlet to the outlet passes through the media and fluid flows from the bypass inlet to the outlet without passing through the media; and a bypass valve assembly shiftable into and out of a closed position in which fluid flow through the bypass inlet is prevented. The bypass inlet is defined about a bypass inlet axis and the outlet is defined about an outlet axis, wherein the axes are at least substantially parallel and at least in close proximity to one another.

A second aspect of the invention concerns a filter wherein the bypass valve assembly includes a projecting valve seat and a valve body shiftable in a first direction into and out of sealing engagement with the valve seat. The valve body includes a first positioning element extending toward the valve seat and cooperating therewith to restrict movement of the valve body in a second direction, wherein the first and second directions are at least generally unparallel to one another.

A third aspect of the present invention concerns a filter wherein the bypass valve assembly further includes a lug operable to limit the range of movement of the valve body in the first direction to a path and the valve body is configured to cooperate with the lug and the valve seat to restrict, along the entire path, movement of the valve body in the second direction.

A fourth aspect of the present invention concerns a filter wherein the bypass valve assembly broadly includes a biasing mechanism yieldably biasing the assembly into the closed position. The mechanism is configured so that the yieldable biasing force provided thereby varies depending on temperature.

Other aspects and advantages of the present invention will be apparent from the following detailed description of the preferred embodiment and the accompanying drawing figures.

BRIEF DESCRIPTION OF THE DRAWING FIGURES

A preferred embodiment of the invention is described in detail below with reference to the attached drawing figures, wherein:

FIG. 5 is a cross-sectional view of the filter taken substantially along line 5—5 of FIG. 4 illustrating the general direction of fluid flow;

DETAILED DESCRIPTION OF THE PREFERRED EMBODIMENT

Figure 1:
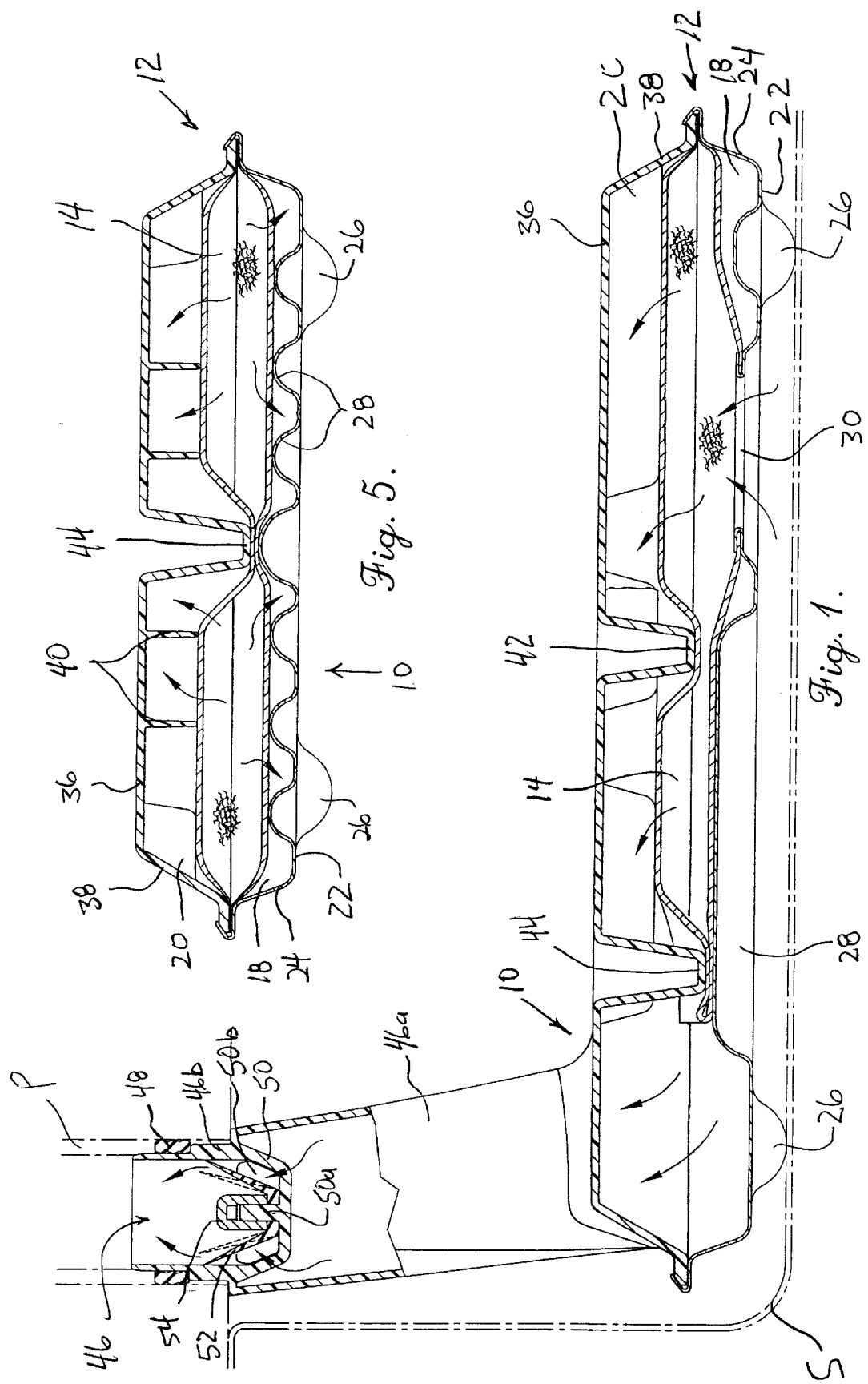
FIG. 1 is a cross-sectional view, taken substantially along line 1—1 of FIG. 4, of a filter constructed in accordance with a preferred embodiment of the present invention and shown in combination with a transmission sump and pump.

FIG. 1 illustrates a filter 10 constructed in accordance with a preferred embodiment of the present invention, at least partially submerged in a fluid-filled transmission sump S and fluidly interposed between the sump S and a transmission pump P (having a pump inlet) of a lubricated transmission system of a powered vehicle. The filter 10 is configured for filtering debris (e.g., solid particles, impurities, etc.) out of the fluid before it enters the pump inlet of the pump P. The inventive filter is particularly suited for use in the transmission system of an automobile; however, the inventive filter could be utilized in virtually any lubricated transmission system utilizing a sump and a pump (e.g., a powered machine), as well as any type of powered vehicle (e.g., airplane, boat, motorcycle, tractor, etc.). The illustrated filter 10 broadly includes a filter housing 12, a filter media 14 disposed within the housing 12, and a bypass valve assembly 16 associated with the housing 12 and spaced from the media 14 (see FIGS. 1 and 2).

Figure 2:
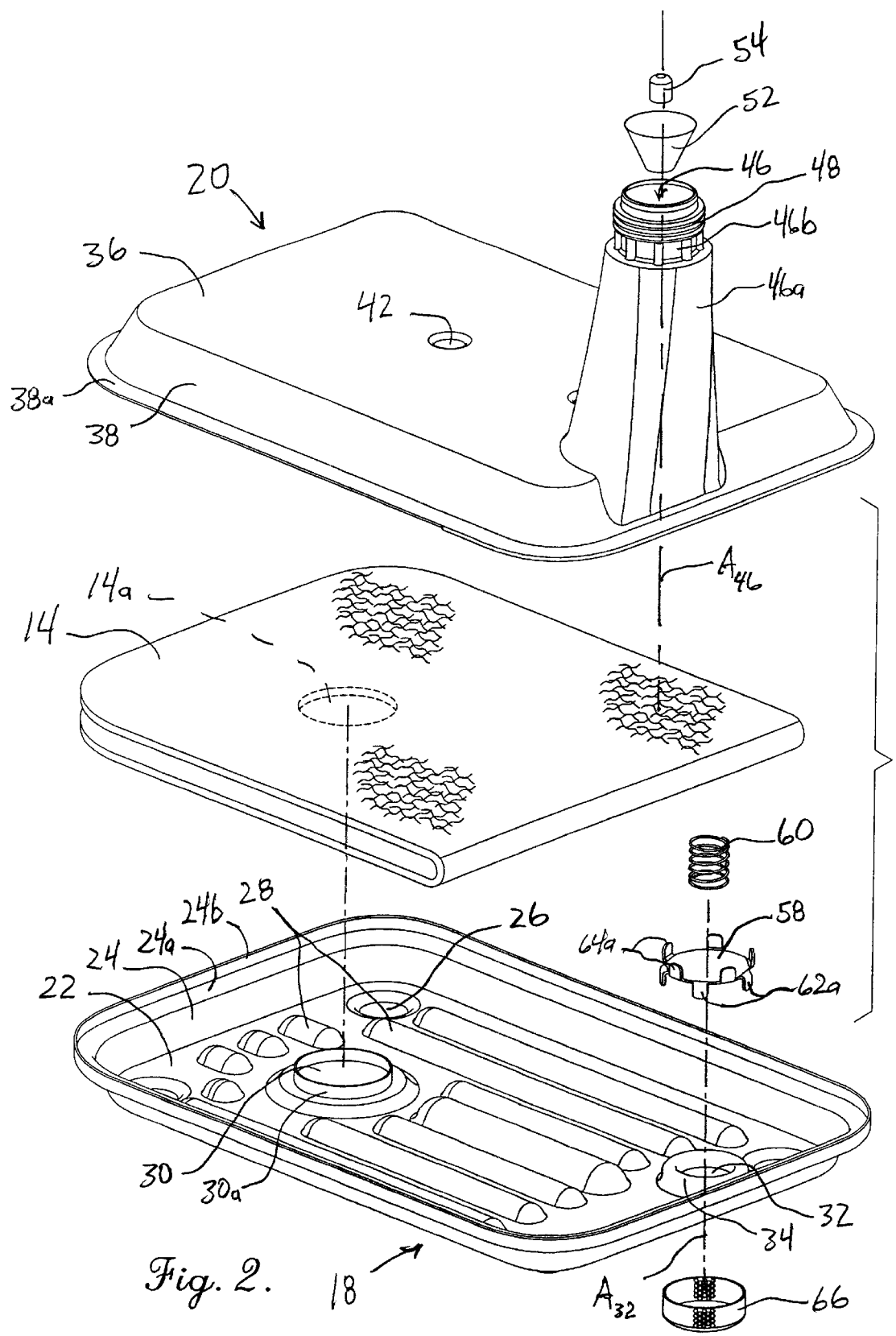
FIG. 2 is an exploded side perspective view of the filter.

Turning to FIG. 2, the filter housing 12 is a dual-body housing including a stamped metal tray section 18 and a molded plastic hood section 20 (see FIG. 2) that cooperatively define a filter chamber therebetween. The tray section 18 has a unitary construction with a generally rectangular shape having a bottom wall 22 and a contiguous side wall 24 angularly extending from the bottom wall 22. Formed in the bottom wall 22 at the four corners are sump legs 26 extending opposite the open face of tray section 18. The sump legs 26 are configured to support the filter 10 on the inside surface of the sump S and provide adequate clearance therefrom so the filter 10 remains at least partially submerged in fluid but allows the fluid to be drawn into the filter 10 as shown in FIG. 1. Formed in the bottom wall 22 along the surface are tray baffles 28 extending toward the open face of the tray section 18. The baffles 28 are spaced from one another to provide fluid channels therebetween (see FIG. 2) with the center baffle projecting further into the filter chamber than the other baffles (see FIG. 5). For purposes that will subsequently be described, the baffles 28 span a length of the bottom wall 22 proportionate to the length of the filter media 14; however, the proportionate length is less than the entire length of the bottom wall 22. The baffles 28 support the filter media 14 so that the media 14 remains out of the fluid channels and fluid is free to flow through the fluid channels after exiting the media 14.

Formed in the bottom wall 22 generally at the distal end (relative to the pump inlet of the pump P) is a filter inlet 30. The filter inlet 30 is a circular aperture having a crimpable collar 30a that extends into the filter chamber. Spaced from the filter inlet 30 and formed in the bottom wall 22 generally at the proximal end (relative to the pump inlet of the pump P) is a bypass inlet 32. The bypass inlet 32 is a circular aperture and for purposes that will subsequently be described includes a projecting valve seat 34 extending into the filter chamber and a crimpable collar 34a concentric to the projecting valve seat 34 (see FIG. 7). The location of the bypass inlet 32 relative to the filter inlet 30 could be variously designed; however, it is important that the filter inlet 30 is laterally spaced from the bypass inlet 32 and located in the portion of the bottom wall 22 having the baffles 28 (and therefore contiguous with the media 14) and the bypass inlet 32 is located in the portion without the baffles 28 (and therefore non-contiguous with the media 14).

The side wall 24 extends from the bottom wall 22 toward the open face of the tray section 18 and includes a rib-receiving lipped portion 24a and a crimpable rib-securing flanged portion 24b formed in the side wall 24 (see FIGS. 1 and 2). The lipped portion 24a is generally parallel to the bottom wall 22 and extends outward from the filter chamber. The flanged portion 24b is generally perpendicular to the lipped portion 24a extending away from the bottom wall 22 prior to assembly of the filter 10 (see FIG. 2).

Figure 3:
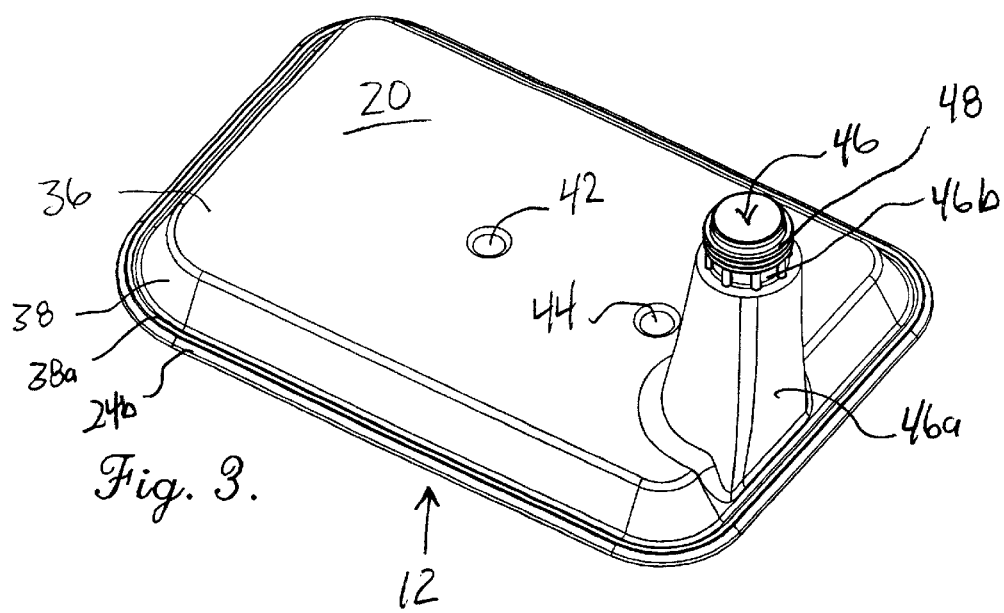
FIG. 3 is a top perspective view of the filter.

The hood section 20 has a unitary construction with a generally rectangular shape complementary to the shape of the tray section 18 (generally a mirror image thereto) having a top wall 36 and a contiguous side wall 38 angularly extending from the top wall 36 (see FIG. 3). Formed in the top wall 36 along the surface are hood baffles 40 extending toward the open base of the hood section 20. The baffles 40 are spaced from one another to provide fluid channels therebetween (see FIG. 5). For purposes that will subsequently be described, the baffles 40 span a length of the top wall 36 proportionate to the length of the filter media 14; however, the proportionate length is less than the entire length of the top wall 36. The baffles 40 detain the filter media 14 so that the media 14 remains out of the fluid channels and fluid is free to flow through the fluid channels after passing through the media 14.

Figure 4:
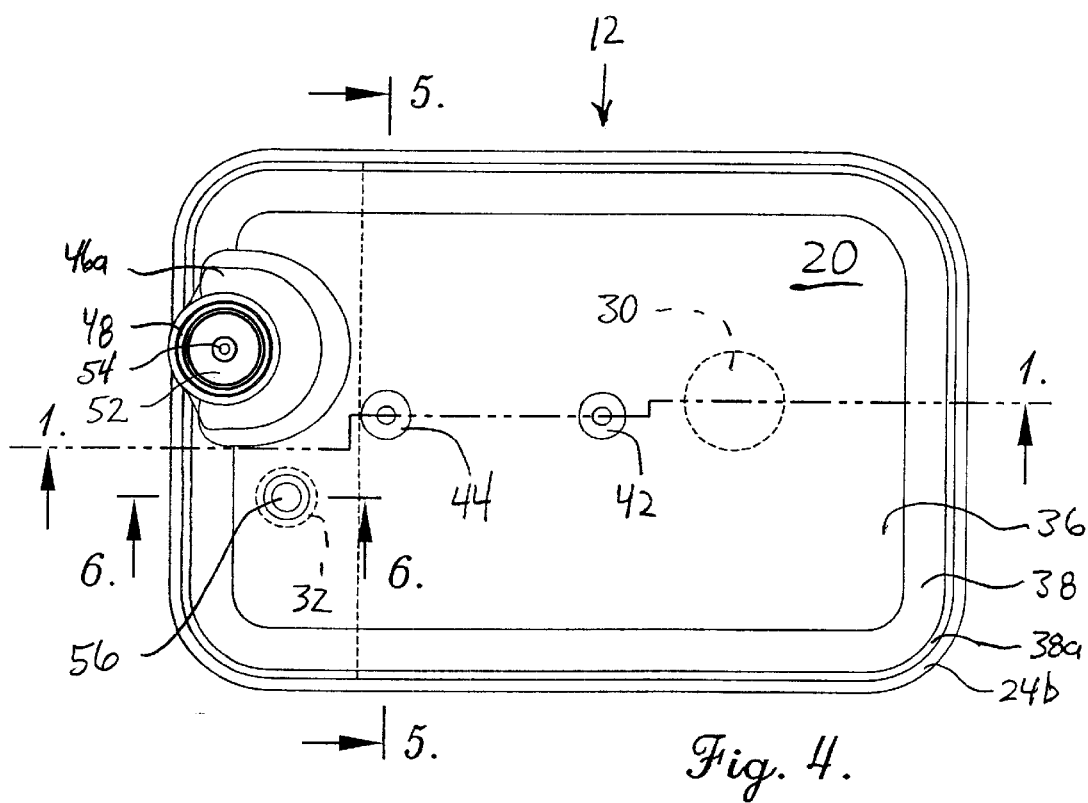
FIG. 4 is a top plan view of the filter.

Formed in the top wall 36 are distal and proximate frustoconical projections 42, 44, respectively (see FIG. 1). The projections 42, 44 are disposed generally along the longitudinal center axis of the hood section 20 (see FIG. 4) and configured to prevent the filter 10 from deforming or collapsing (e.g., during start-up conditions where the suction forces exerted by the pump P are relatively high and the flow of fluid through the media 14 is relatively low). The distal projection 42 is generally located near the geometric center of the top wall 36. The proximate projection 44 is located at or near the demarcation between the baffled portion and the non-baffled portion of the top wall 36. As will subsequently be described in detail, the proximate projection 44 is configured so that it also cooperates with the center tray baffle 28 to serve as a pinch-point that prevents the media 14 from being undesirably suctioned into any of the relevant channels of fluid flow (see FIG. 5).

Formed in the non-baffled portion of the top wall 36 (generally at the proximal end relative to the pump inlet of the pump P) is a filter outlet 46. The filter outlet 46 includes a circular aperture in the top wall 36 and a neck portion 46a thereabove and extending outward from the top wall 36 away from the filter chamber. The neck 46a is configured to be fluidly connected to the pump inlet of the pump P (see FIGS. 1 and 2). In this regard, the terminal end of the neck 46a includes a recessed, ribbed collar 46b with an O ring-type gasket 48 coupled thereto (see FIG. 2). The filter 10 is configured to prime the pump P and in this regard, integrally formed inside the terminal end of the neck 46a is a well housing 50 having a receiver stem 50a and a plurality of fluid inlets 50b (see FIG. 1). A flexible cone-shaped primer valve 52 is configured to fit over the receiver stem 50a and be received in the well housing 50 (see FIGS. 1 and 2). The primer valve 52 is held in place by a cap 54 coupled to the receiver stem 50a (e.g., ultrasonically welded thereto). When the filter 10 is in operation, suction force from the pump P opens the flexible primer valve 52 (as shown in phantom lines in FIG. 1) allowing fluid to exit the filter 10 through the fluid inlets 50b into the pump inlet of the pump P (see FIG. 1). When the filter 10 is not in operation (and the suction force provided by the pump P is terminated) the flexible primer valve 52 closes (as shown in solid lines in FIG. 1) and fluid is retained in the pump P so that the pump P remains primed. The primer valve 52 is formed of a suitable material that provides the valve 52 with its flexible capabilities, with one suitable material being a polymer available from Dupont, P.O. Box 80026, Wilmington, Del. 19880-0026, under the registered mark VAMAC.

The filter outlet 46 and the bypass inlet 32 are each defined about a respective axis $A_{46}$, $A_{32}$ (see FIG. 2) that is generally perpendicular to the bottom and top walls 22, 36. The axes $A_{46}$ and $A_{32}$ are substantially parallel to each other. The filter outlet 46 is positioned so that the axes $A_{46}$ and $A_{32}$ are at least in close proximity to one another so that fluid flowing from the bypass inlet 32 to the filter outlet 46 travels in a substantially straight linear path. Ideally, the filter outlet 46 and the bypass inlet 32 would be coaxial; however, tooling constraints have limited the illustrated filter 10 to the close proximity axial arrangement shown in the drawing figures.

Figure 6:
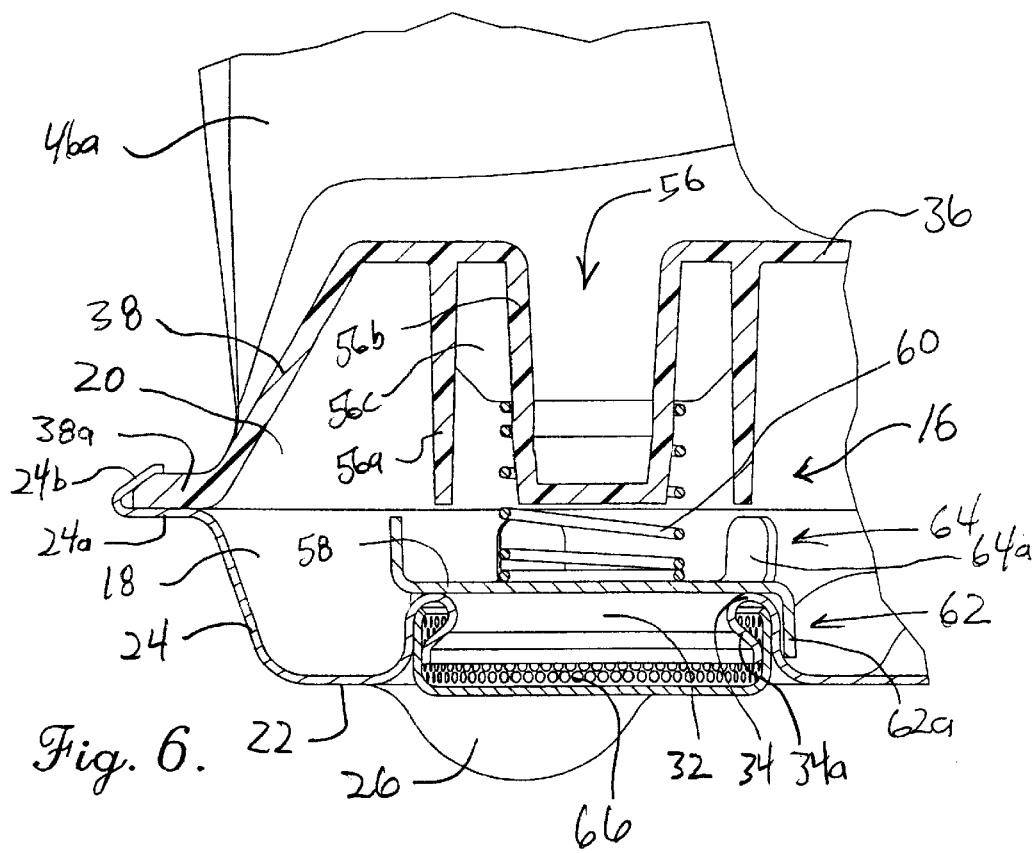
FIG. 6 is a fragmentary cross-sectional view of the filter taken substantially along line 6—6 of FIG. 4 illustrating the valve assembly in the closed position with the valve body in sealing engagement with the valve seat.

Formed in the non-baffled portion of the top wall 36 and complementally opposed to the valve seat 34 and extending theretowards is a lug 56 (see FIG. 6). For purposes that will subsequently be described, the lug 56 includes an outer cylindrical sheath section 56a and an inner stepped frustoconical lug section 56b having ribbing 56c.

The side wall 38 extends from the top wall 36 toward the open base of the hood section 20 and includes a crimping rib 38a (see FIGS. 1 and 2). The rib 38a is generally parallel to the top wall 36 and extends outward from the filter chamber. The rib 38a is configured to be received in the rib-receiving lipped portion 24a of the tray section 18 and secured in place by crimping the flanged portion 24b thereto (see FIG. 5).

The filter housing could utilize various alternative designs, constructions and materials. For example, the housing could be variously shaped to correspond to the particular application to fit between a specific sump and pump. The housing need not utilize a dual-body construction, nor utilize any particular materials are methods of joining the same. It is important; however, that the filter and bypass inlets and the filter outlet are configured such that fluid flowing from the bypass inlet to the filter outlet flows along a generally linear path that does not pass through the filter media and that the filter inlet be spaced from the bypass inlet and that fluid flowing from the filter inlet to the filter outlet passes through the filter media.

The filter media 14 is disposed in the filter chamber within the filter housing 12 and filters debris out of the fluid flowing from the filter inlet 30 to the filter outlet 46. The filter media 14 is formed of a suitable material having filtering qualities and is configured to cooperate with the filter housing 12 to form a filter bag around the filter inlet 30. In this regard, the media 14 is preferably in the form of a flexible material sheet having an aperture 14a positioned to receive the filter inlet collar 30a (see FIG. 2). The filter sheet is placed in the tray section 18 with the aperture 14a positioned over the collar 30a and the collar 30a is crimped over the sheet to hold the media 14 in place (see FIG. 1). The sheet is then doubled over (forming the bag) so that the fold-line is located at or near the demarcation between the baffled portion and the non-baffled portion of the filter housing 12 (see FIGS. 1 and 2). The distal end (relative to the fold-line) and the sides of the of the filter bag are formed by pinching the folded sheet between the crimping rib 38a and the flange 24b of the side walls of the filter housing 12 (see FIGS. 1 and 5). The filter media 14 is further secured by the pinch point provided by the cooperation of the projection 44 with the center tray baffle 28 (see FIG. 5), and retained out of the fluid channels by the projections 42, 44 (see FIG. 1).

Fluid flowing from the sump S through the filter inlet 30 passes through the filter media 14, where debris is filtered out of the fluid, then into the fluid channels and out through the filter outlet 46 into the pump inlet of the pump P (see FIGS. 1 and 5). Fluid flowing from the sump S through the bypass inlet 32; however, does not pass through the filter media 14 but rather flows directly to the filter outlet 46 (see FIG. 7). The fluid is drawn into the filter 10 by the suction force created by the pump P.

The filter media could be formed of various materials and utilize any workable design and configuration so long as fluid flowing from the filter inlet is filtered by the media before exiting the filter outlet and fluid flowing from the bypass inlet does not pass through the media before exiting the filter outlet.

Under normal conditions (e.g., ambient temperatures above −18 degrees Celsius) the viscosity of the fluid is such that the fluid is adequately drawn through the filter media and into the pump. During conditions other than normal (e.g., cold conditions where the ambient temperature is below −40 degrees Celsius) the viscosity of the fluid is such that the fluid is not adequately drawn through the filter media (e.g., the viscosity of the fluid resembles toothpaste) and therefore sufficient fluid is not provided to the pump. It is therefore desirable to bypass the filter media during conditions other than normal. Accordingly, the filter 10 includes means for bypassing the filter media 14 when bypass is desired.

In the illustrated filter 10, this desired bypass is provided by the bypass valve assembly 16. The valve assembly 16 broadly includes a valve body 58 and a spring 60 coupled between the coaxially aligned projecting valve seat 34 and opposing lug 56 (see FIGS. 2 and 6). The valve body 58 is a circular shaped flat disk having a first positioning element 62 and a second positioning element 64. The element 62 comprises a plurality of circumferentially spaced seat tabs 62a extending from the edge of the body 58 toward the valve seat 34. The valve body 58 and the valve seat 34 are configured to provide engagement therebetween when the valve 16 is in a closed position as shown in FIG. 6. Particularly, the spring 60 presses the disk against the seat 34 with enough force that during normal operating conditions, the flow path of least resistance is through the filter media 14. The valve assembly 16 is shiftable along a first direction into and out of the closed position, wherein the first direction is generally parallel to the axis common to both the seat 34 and the lug 56 so that the body 58 is aligned therebetween. The first positioning element 62 is configured to allow the sealing engagement of the body 58 with the seat 34 and cooperate with the seat 34 to restrict movement of the body 58 in a second direction. The first and second directions are at least generally unparallel to one another and movement of the body 58 in the second direction results in misalignment of the body 58 with the seat 34. Movement of the body 58 in the second direction is restricted by circumscribed engagement of the seat tabs 62a with the circumferential surface of the projecting seat 34.

Figure 7:
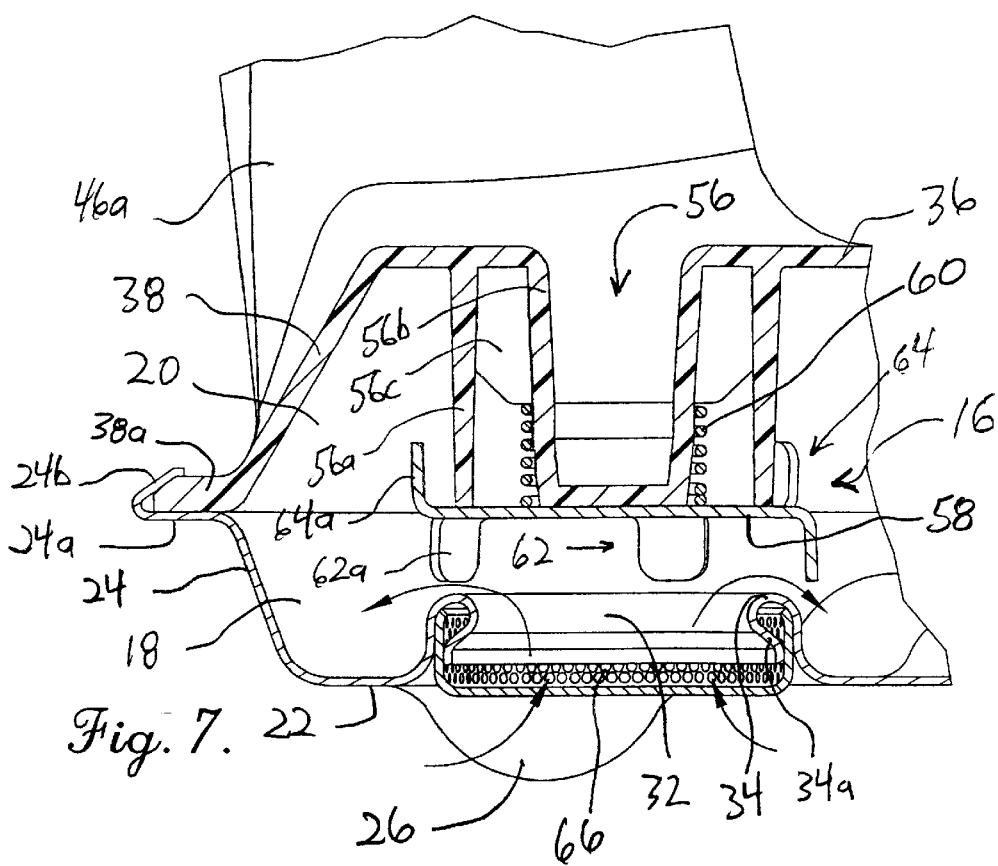
FIG. 7 is a fragmentary cross-sectional view similar to FIG. 6 illustrating the valve assembly filly open with the valve body engaging the lug.

The second positioning element 64 comprises a plurality of circumferentially spaced lug tabs 64a extending from the edge of the body 58 toward the lug 56. The valve body 58 and the lug 56 are configured to provide aligned engagement therebetween when the valve 16 is in a fully open position as shown in FIG. 7. The lug 56 serves as a stop to limit the range of movement of the body 58 along the first direction to thereby define a path. In operation, the body 58 oscillates along this path, shifting to and from the fully open and closed positions. The second positioning element 64 is configured to allow the aligned engagement of the body 58 with the lug 56 and cooperate with the lug 56 to restrict movement of the body 58 in the second direction. Movement of the body 58 in the second direction is restricted by circumscribed engagement of the lug tabs 64a with the outer circumferential surface of the sheath section 56a of the lug 56.

The seat and lug tabs 62a, 64a are dimensioned so that movement of the body 58 in the second direction is restricted along the entire path of movement. Although the tabs 62a, 64a that restrict movement in the second direction will change as the body 58 shifts from the closed position to the fully open position and back, either the seat tabs 62a or the lug tabs 64a will be in engagement with the respective seat 34 or lug 56 at all times as the body 58 oscillates along the path. To facilitate manufacturing, the tabs 62a, 64a are offset along the circumference of the disk and unitary therewith (e.g., the tabbed disk is stamped out of metal and the tabs are then folded into position).

Once bypass conditions no longer exist during operation (e.g., after start-up or after the fluid achieves a temperature that adequately reduces the viscosity), it is desirable to prevent bypass so that fluid flows through the media 14 and is thoroughly filtered. In this regard, the bypass valve assembly 16 of the illustrated filter 10 is yieldably biased into the closed position by the spring 60 (see FIG. 6). The yieldable biasing force provided by the spring 60 is such that in cold conditions (e.g., −40 degrees Celsius or below) the suction force of the pump P (and corresponding differential pressure across the valve 16) overcomes the biasing force of the spring 60 (thereby opening the bypass valve 16), but in normal conditions (e.g., −18 degrees Celsius or above) the biasing force of the spring 60 overcomes the suction force of the pump P (thereby closing the valve 16). The spring 60 can be formed from any suitable material that provides the desired yieldable biasing capabilities, with a preferred material being cold rolled steel. However, the spring could alternatively utilize a bimetallic configuration so that the yieldable biasing force provided thereby is a variable spring rate that varies depending on temperature. Preferred materials for a bimetallic spring include the following metal alloys: nickel-titanium, copper-zinc-aluminum, or copper-aluminum-nickel.

As shown in FIGS. 6 and 7, the spring 60 is configured to couple to the stepped frustoconical lug section 56b and extend therefrom to maintain pressure against the surface of the valve body 58 along its entire path of movement. In this regard, the steps of the lug section 56b include an upper step configured to cooperate with the spring 60 to secure (i.e., frictionally engage) the spring 60 to the lug section 56b, and a lower step configured to allow the spring 60 to be fully received on the lug section 56b but not secured thereto (e.g., when the valve 16 is in the fully open position as shown in FIG. 7). The ribs 56c of the lug 56 cooperate with the upper step to maintain the spring 60 in place on the stepped portion of the inner lug 56b.

The valve 16 is normally in the closed position as shown in FIG. 6 and fluid flows from the filter inlet 30 through the filter media 14 out the filter outlet 46 and into the pump inlet of the pump P. When the suction force provided by the pump P creates a sufficient differential pressure across the valve 16 (e.g., at temperatures of −40 degrees Celsius and below the fluid is too viscous to be drawn through the media 14), the biasing force of the spring 60 is overcome and the valve 16 opens. With the valve 16 open, fluid flows from the bypass inlet 32 (without passing through the media 14) out the filter outlet 46 and into the pump inlet of the pump P (see FIG. 7). When the differential pressure across the valve 16 is sufficiently reduced (e.g., at temperatures of −18 degrees Celsius and above where the viscosity of the fluid is such that the fluid is adequately drawn through the media 14), the biasing force of the spring 60 overcomes the suction force of the pump P and the valve 16 closes. The linear flow of fluid from the bypass inlet 32 to the filter outlet 46 combined with the qualities of the spring 60 optimize the opening and closing of the valve 16 in the desired conditions.

Because fluid flowing from the bypass inlet 32 to the filter outlet 46 does not pass through the filter media 14, the bypass valve assembly preferably includes a bypass inlet filter 66 for filtering debris out of the fluid flowing from the bypass inlet 32 to the filter outlet 46 (see FIGS. 2 and 7). The bypass filter 66 is formed of any suitable material (e.g., metal screen) and configured to be engagingly received within the bypass inlet 32 so that fluid flowing through the inlet 32 passes through the filter 66. The illustrated bypass filter 66 is in the form of a screen secured in place by crimping the collar 34a of the projecting valve seat 34 over the circumferential edge of the filter 66 (see FIGS. 6 and 7).

The bypass valve assembly could utilize various alternative designs, constructions and materials. For example, the valve body could utilize a single positioning element cooperating with either the lug or the seat to restrict movement in the second direction along the entire length of the path of movement. The assembly could utilize a biasing mechanism other than a spring. It is important; however, that the assembly provide the desired bypass capabilities (e.g., open in cold and/or start-up conditions and closed during normal operating conditions).

To initially assemble the illustrated filter 10, the filter media 14 (unfolded) is placed in the tray section 18 so that the aperture 14a aligns with filter inlet collar 30a and the collar 30a is crimped over the media 14 (see FIG. 1). The filter media 14 is folded in half so that the media 14 fills the baffled filter chamber and the fold-line aligns with the demarcation between the baffled portion and the non-baffled portion of the filter housing 12 (see FIGS. 1 and 2). The bypass inlet filter 66 is placed in the bypass inlet 32 under the collar 34a and the collar 34a is crimped over the open circumferential edge of the filter 66. The valve body 58 is placed over the projecting valve seat 34 so that the seat lugs 62a circumscribe the circumferential surface of the seat 34 (see FIG. 6). The spring 60 is coupled onto the inner lug section 56b of the lug 56 on the hood section 20. The hood section 20 is then placed into the tray section 18 so that distal and side edges of the filter media 14 are interposed between the lipped portion 24a of the side wall 24 and the ribbed portion 38a of the side wall 38 (see FIG. 1). The flanged portion 24b of the side wall 24 is then crimped over the rib 38a to secure the filter housing 12 together (see FIG. 5). The filter 10 is then placed into the transmission sump S and the neck 46a is coupled to the pump inlet of the transmission pump P (see FIG. 1).

Operation

During initial start-up (e.g., the vehicle's engine is not currently running), when the transmission pump P is first activated, fluid stored above the primer valve 52 (this fluid was deposited in the valve 52 when the pump P was previously deactivated and the valve 52 closed—as shown in solid lines in FIG. 1—capturing fluid that would otherwise drain from the pump P back into the filter 10) primes the pump P. Once the pump P is activated and primed, the primer valve 52 opens (as shown in phantom lines in FIG. 1) so that fluid flowing from the filter 10 can pass through the fluid inlets 50b and into the pump inlet of the pump P.

Once the transmission pump P is activated, the suction force provided thereby draws fluid from the transmission sump S into the filter 10, through the filter 10 where debris is filtered out of the fluid, and out of the filter 10 through the filter outlet 46 into the pump inlet of the pump P. Fluid is drawn into the filter 10 either through the filter inlet 30 or the bypass inlet 32 depending on the conditions. Under normal conditions (e.g., ambient temperatures of −18 degrees Celsius or above) the viscosity of the fluid is such that the fluid is adequately pulled into the filter inlet 30 and through the filter media 14 so that the differential pressure across the bypass valve assembly 16 does not overcome the biasing force exerted on the valve body 58 by the spring 60 and the valve 16 remains in the closed position as shown in FIG. 6. When the valve 16 is closed, the spring 60 retains the body 58 in sealing engagement with the projecting valve seat 34 and fluid is thereby prevented from flowing through the bypass inlet 32. Fluid drawn through the filter media 14 enters the bag at the aperture 14a and is pulled through the media 14 into the fluid channels defined by the baffles 28, 40 where it is carried to the filter outlet 46 (see FIGS. 1 and 5). The media 14 is prevented from being sucked into the filter outlet 46 by the pinch point provided by the cooperation of the projection 44 and the center tray baffle 28. The media 14 is prevented from being sucked into the fluid channels by the projection 42 (see FIG. 1).

Under bypass conditions (e.g., ambient temperatures of −40 degrees Celsius or below) the viscosity of the fluid is such that the fluid is not sufficiently pulled through the media 14 so that the differential pressure across the valve 16 overcomes the biasing force of the spring 60 to fully open the valve 16 as shown in FIG. 7. The suction force provided by the pump P, the axial alignment of the bypass inlet 32 and the filter outlet 46, and the qualities of the spring 60 cooperate to determine what bypass conditions cause the valve to open and close. It is desirable to bypass the filter media in cold and/or start-up conditions where fluid is not sufficiently provided to the pump P. In the illustrated filter 10, bypass occurs at approximately −40 degrees Celsius and below and continues until the ambient temperature in and around the fluid is about −18 degrees Celsius or above. When the valve 16 is fully open, the valve body 58 is held against the lug 56 so that fluid flows into the bypass inlet 32, through the bypass filter inlet 66 where debris is filtered out of the fluid, and out of the filter outlet 46 into the pump inlet of the pump P (see FIG. 7). The valve 16 remains open until bypass conditions are no longer present (e.g., ambient fluid temperature has reached −18 degrees Celsius) wherein the biasing force of the spring 60 overcomes the suction force of the pump P and closes the valve 16 by shifting the valve body 58 back into sealing engagement with the valve seat 34 (see FIG. 6).

When the valve 16 is shifting into and out of the closed position, the valve body 58 moves in the first direction along the defined path and thereby remains in continual alignment with both the valve seat 34 and the lug 56. The valve body 58 is restricted from moving in the second direction (i.e., the direction of misalignment) by the cooperation of the first and second positioning elements 62, 64 and the respective valve seat 34 and lug 56. In particular, when the valve 16 is in the closed position the seat tabs 62a circumscribingly engage the circumferential surface of the seat 34 and continue this engagement as the valve body 58 shifts out of the closed position until the body 58 has moved sufficiently toward the fully open position that the lug tabs 64a circumscribingly engage the outer circumferential surface of the sheath section 56a of the lug 56. The lug tabs 64a continue this engagement while the body 58 shifts into—and while the body 58 is in—the fully open position. This sequence is reversed as the body 58 shifts from the fully open position back into the closed position. In this manner, the body 58 is restricted from moving in the second direction along its entire path of movement.

It is noted that the bypass valve is configured to remain closed during normal operating conditions, which have been described herein as ambient temperatures of −18 degrees Celsius or above. However, those skilled in the art will appreciate that conditions other than operating temperature may cause opening of the bypass valve 16 (e.g., clogging of the filter inlet 30).

The preferred form of the invention described above is to be used as illustration only, and should not be utilized in a limiting sense in interpreting the scope of the present invention. Obvious modifications to the exemplary embodiment, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A transmission fluid filter comprising:

a filter housing presenting a filter inlet, a bypass inlet spaced from the filter inlet, and an outlet spaced from the inlets;

filter media in the housing such that fluid flowing from the filter inlet to the outlet passes through the media and fluid flows from the bypass inlet to the outlet without passing through the media; and a bypass valve associated with the bypass inlet, said valve being shiftable into and out of a closed position in which fluid flow through the bypass inlet is prevented, said bypass valve including a valve seat and a valve body positionable in sealing engagement with the valve seat when the valve is in the closed position, said bypass valve being yieldably biased into the closed position, said body having positioning tabs perimetrically disposed and cooperating with the valve seat to position the body on the seat when the valve is in the closed position said bypass inlet being defined about a bypass inlet axis and said outlet being defined about an outlet axis, said axes being at least substantially parallel and at least in close proximity to one another.

2. A transmission fluid filter comprising:

a filter housing presenting a filter inlet, a bypass inlet spaced from the filter inlet, and an outlet spaced from the inlets;

filter media in the housing such that fluid flowing from the filter inlet to the outlet passes through the media and fluid flows from the bypass inlet to the outlet without passing through the media; and a bypass valve assembly shiftable into and out of a closed position in which fluid flow through the bypass inlet is prevented, said bypass valve assembly including a projecting valve seat and a valve body shiftable in a first direction into and out of sealing engagement with the valve seat, said valve body including a first positioning element extending toward the valve seat and cooperating therewith to restrict movement of the valve body in a second direction, wherein the first and second directions are at least generally unparallel to one another, said bypass valve assembly including a lug in an opposed relationship with the valve seat, said valve body including a second positioning element projecting oppositely relative to the first positioning element, said second positioning element extending toward the lug and cooperating therewith to restrict movement of the valve body in the second direction, each of said positioning elements comprising a plurality of spaced apart tabs.

3. In a powered vehicle including a lubricated transmission having a transmission sump and a transmission pump, a fluid filter fluidly interposed between the sump and the pump, the filter comprising:

a filter housing presenting a filter inlet, a bypass inlet spaced from the filter inlet, and an outlet spaced from the inlets;

filter media in the housing such that fluid flowing from the filter inlet to the outlet passes through the media and fluid flows from the bypass inlet to the outlet without passing through the media; and a bypass valve assembly shiftable into and out of a closed position in which fluid flow through the bypass inlet is prevented, said bypass valve assembly including a projecting valve seat and a valve body shiftable in a first direction into and out of sealing engagement with the valve seat, said valve body including a first positioning element extending toward the valve seat and cooperating therewith to restrict movement of the valve body in a second direction, wherein the first and second directions are at least generally unparallel to one another, said positioning element comprising a plurality of spaced apart tabs.

* * * * *